United States Patent [19]
Corporon et al.

[11] Patent Number: 5,860,687
[45] Date of Patent: Jan. 19, 1999

[54] VEHICLE SPARE TIRE STORAGE SYSTEM HAVING STIFFENING PLATE

[75] Inventors: Max A. Corporon, Bloomfield Hills; Dave P. Hartman, Columbiaville; Norman B. Robbins, Davison, all of Mich.

[73] Assignee: Chrysler Corporation, Auburn Hills, Mich.

[21] Appl. No.: 994,509

[22] Filed: Dec. 19, 1997

[51] Int. Cl.⁶ ...................................................... B62D 9/00
[52] U.S. Cl. ...................................... 296/37.2; 224/42.12
[58] Field of Search ................................. 216/37.2, 37.3; 224/42.12

[56] References Cited

U.S. PATENT DOCUMENTS

| | | | |
|---|---|---|---|
| 2,660,348 | 11/1953 | Muller | 296/37.2 |
| 3,490,041 | 1/1970 | Bott | 296/37.2 |
| 3,595,335 | 7/1971 | Wessells, III | 296/37.2 X |
| 4,398,765 | 8/1983 | Ishikawa | 296/37.2 |
| 4,423,900 | 1/1984 | Sugimoto et al. | 296/37.14 |
| 4,533,169 | 8/1985 | Rauthmann et al. | 296/37.2 |
| 4,687,124 | 8/1987 | Mahr | 224/42.24 |
| 4,991,898 | 2/1991 | Nomura | 296/37.2 |
| 5,195,780 | 3/1993 | Inoue et al. | 280/834 |
| 5,419,609 | 5/1995 | Kmiec et al. | 296/188 |
| 5,586,698 | 12/1996 | Satoh | 224/42.24 |
| 5,669,534 | 9/1997 | Edgerley | 296/37.2 X |

FOREIGN PATENT DOCUMENTS 405178240   7/1993   Japan ................................. 296/37.2

*Primary Examiner*—Joseph D. Pape
*Attorney, Agent, or Firm*—Thomas G. Pasternak

[57] ABSTRACT

The present invention consists of a stiffening plate for a spare tire storage system that is supported by a plurality of protrusions in the form of raised beads in the tub floor. The plate is raised from the tub floor via the beads, the structure thus forming a "double thick" cross section that reduces low frequency vibration, while at the same time allowing drainage during the coating process from between the layers and which does not increase weight or cost.

13 Claims, 2 Drawing Sheets

VEHICLE SPARE TIRE STORAGE SYSTEM HAVING STIFFENING PLATE

BACKGROUND OF THE INVENTION

1. Technical Field

The present invention generally relates to a storage system for a vehicle spare tire. More particularly, the present invention relates to a stiffening plate for use in a storage system for a spare tire of a vehicle having a rearwardly located storage area, the storage system including a storage tub located below the floor of the vehicle and a cover for this tub.

2. Discussion

Automotive vehicles, such as minivans, vans, station wagons, sport utilities and the like, are often purchased for their carrying capacity. These types of vehicles typically include a rear storage area accessible via a lift gate or tail gate. The aforementioned vehicles typically are not provided with a trunk, and packaging issues frequently arise concerning storage of the spare tire. Frequently, the spare tire is mounted in an upright position within the rearward storage area and adjacent one of the vehicle side walls. However, this type of storage significantly impacts the carrying capacity of the vehicle and reduces visibility.

It is also known to mount the spare tire to the underside of the vehicle body. Here, access to the spare tire is difficult. In other arrangements, the spare tire is mounted to the lift gate or on a swing gate positioned adjacent the lift gate. Such arrangements are disadvantageous in that additional weight is carried by the lift gate or the swing gate must be moved out of the way before access to the lift gate may be obtained.

It is also known to store the spare tire within a storage compartment or tub provided below the vehicle's floor. A cover is typically provided for concealing the tub. A vehicle spare tire system having a reinforced cover is disclosed in United States application Ser. No. 08/939,924, titled "Vehicle Spare Tire Storage System Having a Reinforced Cover," owned by common assignee Chrysler Corporation, which is hereby incorporated by reference. Such storage systems by their nature typically are a source of low frequency NVH (noise, vibration and harshness) in the vehicle, such as "boom," a low frequency noise phenomenon associated with such systems.

SUMMARY OF THE INVENTION

Accordingly, it is a principal objective of the present invention to provide a stiffening plate for a storage system for a vehicle spare tire that reduces low frequency noise.

It is another objective of the present invention to provide a stiffening plate for a storage system for a vehicle spare tire which allows drainage during vehicle liquid washing and coating operations.

It is yet another object of the present invention to provide a stiffening plate for a storage system for a vehicle spare tire which includes attachment points for various devices such as spare tire mounting hardware.

In one form, the present invention consists of a stiffening plate for a spare tire storage system that is supported by a plurality of protrusions in the form of raised beads in the tub floor. The plate is raised from the tub floor via the beads, the structure thus forming a "double thick" cross section that reduces low frequency vibration, while at the same time allowing drainage during the coating process from between the layers and which does not increase weight or cost.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
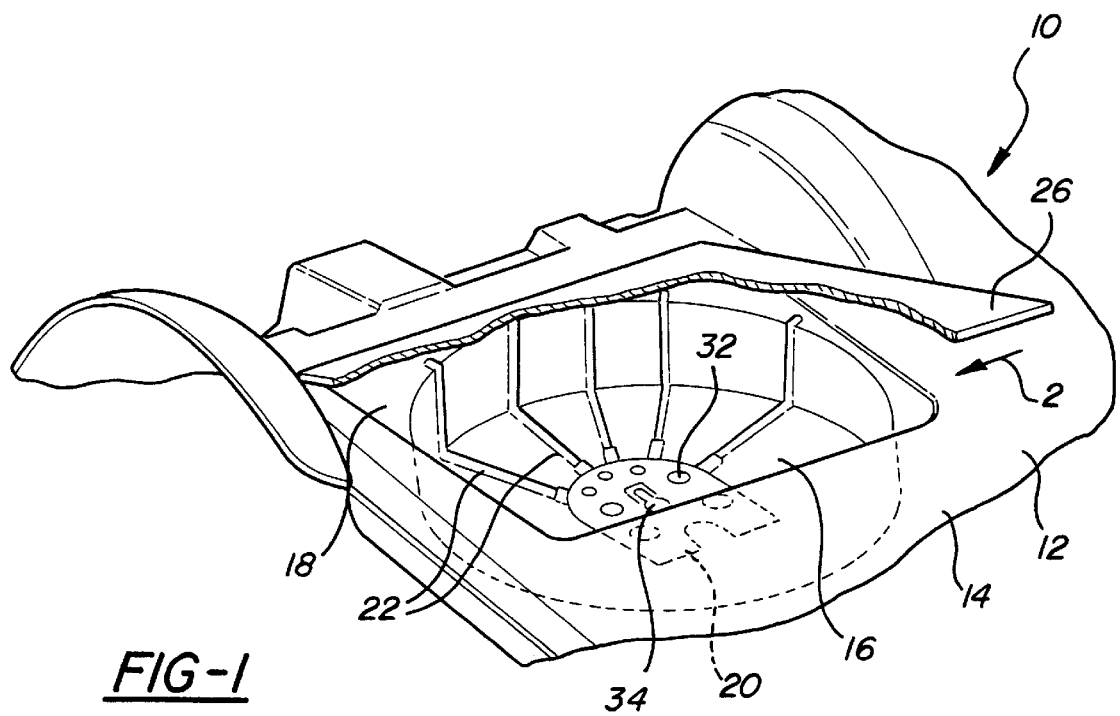
FIG. 1 is a perspective elevational partially phantom fragmentary view illustrating a portion of a motor vehicle incorporating the stiffening plate for a storage system for a spare tire constructed in accordance with the teachings of a preferred embodiment of the present invention.

Turning first to the fragmentary view of FIG. 1, a spare tire storage system 10 for a motor vehicle 12 is illustrated. The spare tire storage system 10 is shown operatively installed within a rear storage area 14 of the vehicle 12. The exemplary vehicle partially shown in FIG. 1 is a minivan, sport utility vehicle, or the like. However, it will be understood that the teachings of the present invention are more widely applicable to various other vehicles.

Turning first to FIG. 1, a vehicle spare tire storage system having a stiffening plate 20 according to the preferred embodiment of the present invention is shown, and includes a tub 16 located below the floor 18 of the vehicle 12. The tub 16 defines a storage area for storing a spare tire, either a full-size spare, but alternatively a reduced-size spare. Stiffener plate 20 is attached to the bottom of tub 16 at a plurality of raised beads 22 and to the floor itself via touch down pads 23 (See shown in FIG. 3). The spare tire storage system 10 is further shown to include a cover 26 for selectively providing access to the storage area 16.

Figure 2:
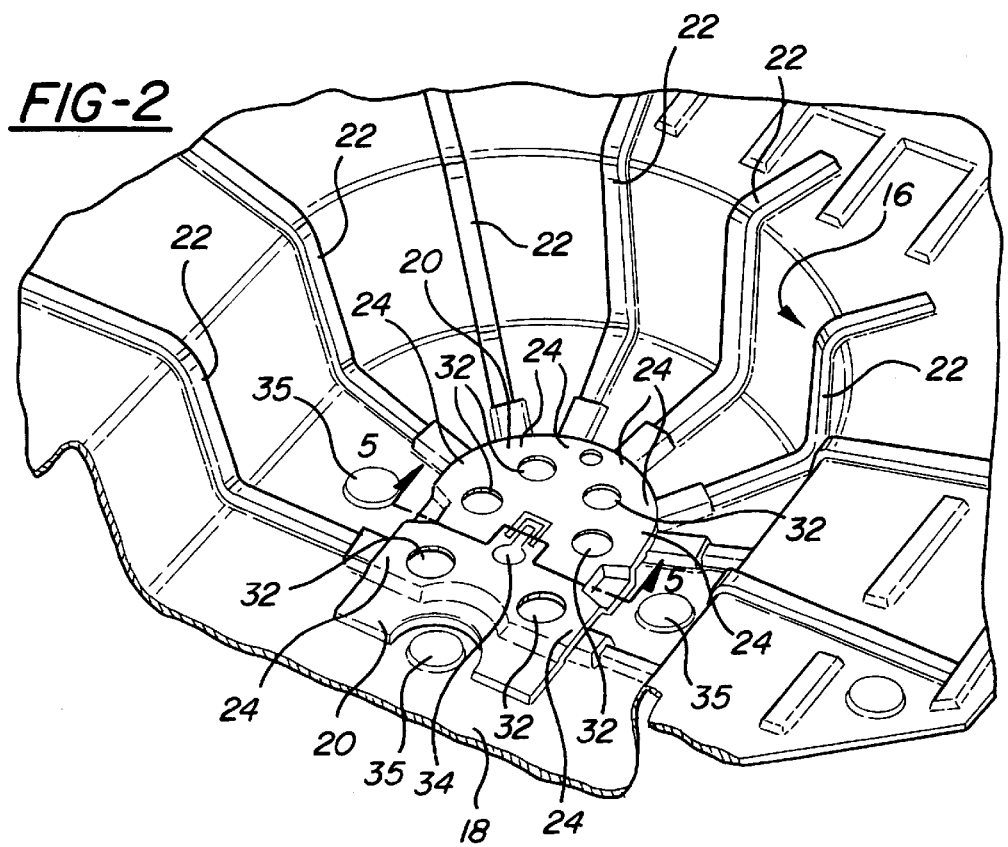
FIG. 2 is a top perspective fragmentary view of the stiffening plate of the preferred embodiment of the present invention in place in the vehicle tub.
Figure 3:
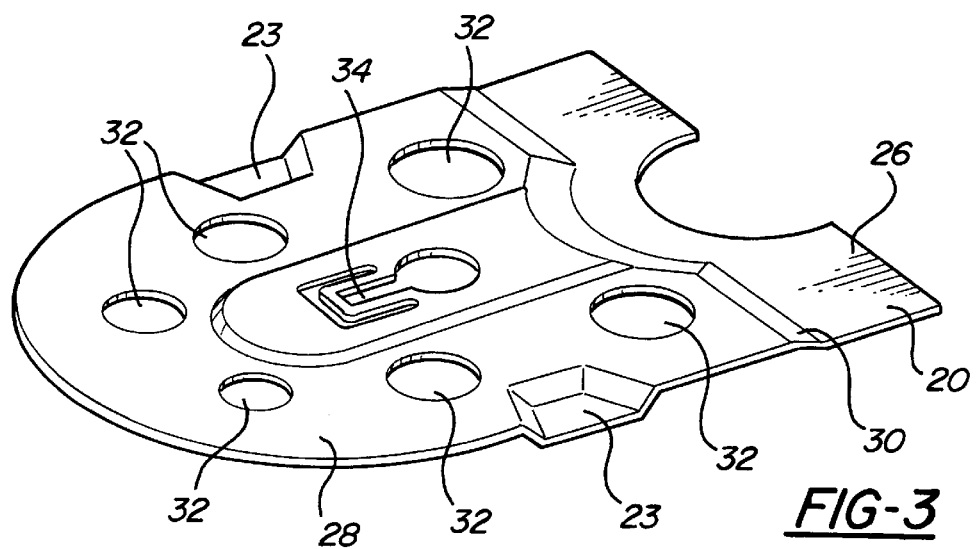
FIG. 3 is a perspective view of the stiffening plate of the present invention.
Figure 4:
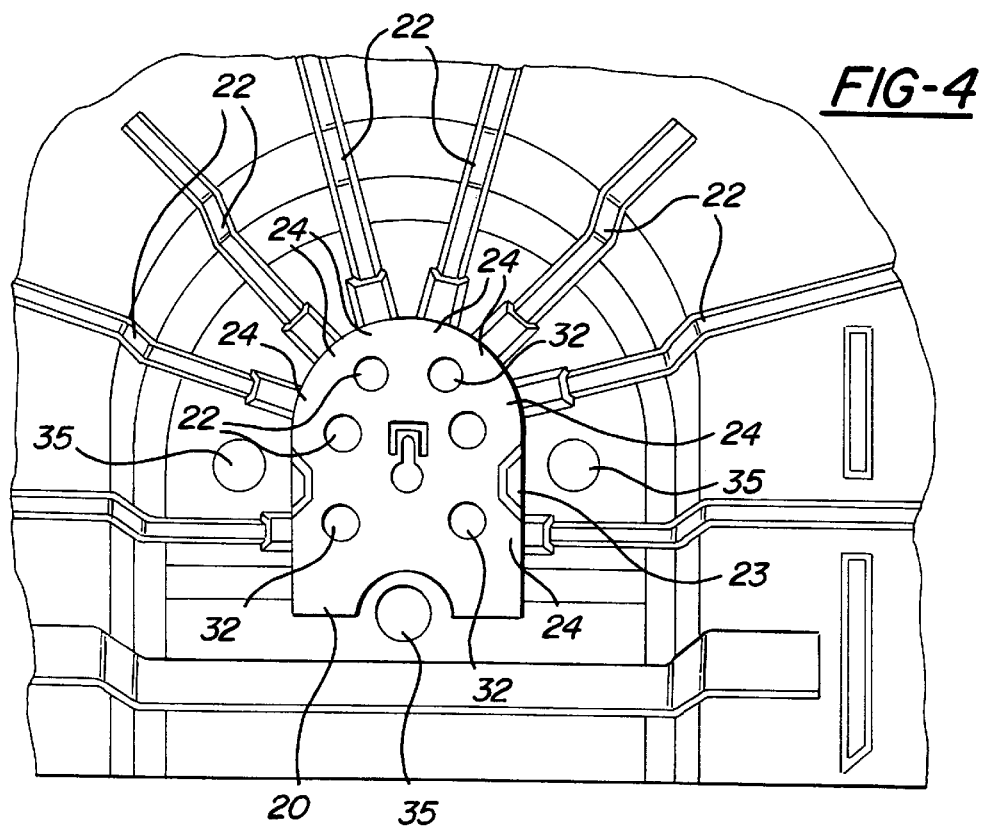
FIG. 4 is a top fragmentary view of the stiffening plate of the present invention installed in a vehicle tub.

Turning to FIG. 2, FIG. 3, and FIG. 4, stiffening plate 20 can be seen operatively installed within tub 16. Floor 18 defines a plurality of raised beads 22 that preferably are formed when the sheet metal member that forms the floor is stamped. Stiffening plate 20 is preferably spot welded to each raised bead via a plurality of spot welds 24. It is also spot welded to the vehicle floor and touch down pads 23.

FIG. 3 shows the details of stiffening plate 20. As can be seen, the plate consists of a lower shelf 26 connected to an upper shelf 28 via a tapered surface 30. It also has two depressed touch down pads 23 for connection to the vehicle floor. Plate 20 defines a plurality of lightening holes 32. A plurality of drain openings 35 allow drainage of fluid during paint/dipping/coating operations. Therefore fluids drain via drainage openings 35 and exit the vehicle during the manufacturing process. Plate 20 preferably also has attachment points for various hardware such as tire attachment recess 34, to which hardware to retain a spare tire in place is connected.

Figure 5:
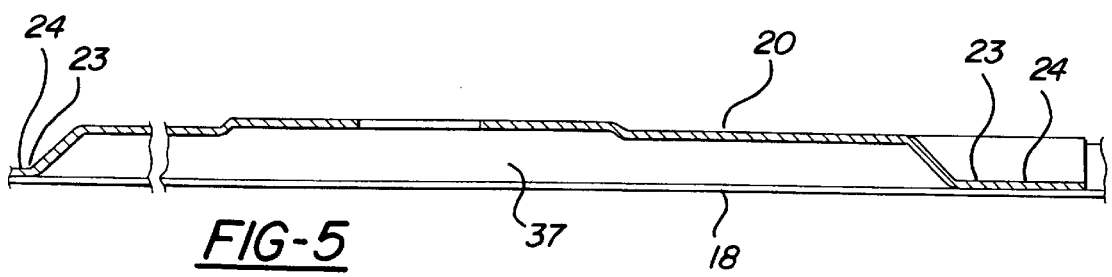
FIG. 5 is a cross-sectional view taken along line 5—5 of FIG. 2.

In cross section (see FIG. 5) connection of plate 20 to floor 18 forms a double thickness floor with hollow cross section 37. This structure has been shown to reduce the NVH low frequency noise commonly associated with spare tire storage of vehicle spare tires in this manner.

While the above description constitutes the preferred embodiment of the invention, it will be appreciated that the invention is susceptible to modification, variety, and change without departing from the proper scope or fair meaning of the accompanying claims.

What is claimed is:

1. In a spare tire storage system, including a tub located beneath the floor of a vehicle, said tub having a tub floor, the improvement comprising a stiffener plate secured to said tub floor at a distance from said tub floor, said stiffener plate comprising a plurality of lowered areas for attachment to said tub floor.

2. The system of claim 1 wherein said tub floor comprises a plurality of raised beads, said plate secured to said beads.

3. The system of claim 2 wherein said plate is secured to said floor by spot welds.

4. The system of claim 1 wherein said plate comprises attachment means for attachment to hardware.

5. The system of claim 1 wherein said vehicle floor comprises a plurality of drainage openings.

6. A vehicle spare tire storage system comprising:

a tub located beneath the floor of the vehicle;

said tub further comprising a tub floor;

said tub floor further comprising a plurality of raised beads;

a stiffener plate having a periphery;

said stiffener plate resting on said beads in a spaced relationship from said tub floor; and said stiffener plate secured to at least one of said beads.

7. The system of claim 6, said stiffener plate further comprises a plurality of lowered areas, said plate secured to said tub floor at at least one of said areas.

8. The system of claim 6 wherein said stiffener plate comprises a plurality of lightening holes.

9. The system of claim 7 wherein said stiffener plate is attached to said tub floor via a combination of said lowered area and said beads.

10. A vehicle spare tire storage system comprising:

a tub located beneath the floor of the vehicle;

said tub further comprising a tub floor;

said floor further comprising a plurality of raised beads;

a stiffener plate having a periphery;

said stiffener plate resting on said beads in a spaced relationship from said floor; and said stiffener plate welded to at least one of said beads.

11. The system of claim 10 wherein said stiffener plate further comprises a plurality of lowered areas, said plate secured to said tub floor at at least one of said lowered areas.

12. The system of claim 10, wherein said stiffener plate comprises a plurality of lightening holes.

13. The system of claim 11 wherein said stiffener plate is attached to said tub floor via a combination of said lowered areas and said beads.

* * * * *